United States Patent [19]
Kocis

[11] Patent Number: 5,467,453
[45] Date of Patent: Nov. 14, 1995

[54] CIRCUIT FOR PROVIDING AUTOMATIC SCSI BUS TERMINATION

[75] Inventor: Thomas Kocis, Austin, Tex.

[73] Assignee: Dell USA, L.P., Austin, Tex.

[21] Appl. No.: 94,642

[22] Filed: Jul. 20, 1993

[51] Int. Cl.$^6$ .................................................. H01R 9/07
[52] U.S. Cl. ........................... 395/281; 333/32; 333/17.3; 333/22 R; 395/822
[58] Field of Search ..................... 395/325, 425; 333/32

[56] References Cited

U.S. PATENT DOCUMENTS

| | | | |
|---|---|---|---|
| 4,047,157 | 9/1977 | Jenkins | 395/425 |
| 4,284,849 | 8/1981 | Anderson et al. | 379/38 |
| 4,679,166 | 7/1987 | Berger et al. | 395/650 |
| 4,988,890 | 1/1991 | Narhi et al. | 307/147 |

*Primary Examiner*—Jack B. Harvey
*Assistant Examiner*—Jeffrey K. Seto
*Attorney, Agent, or Firm*—David Hitt; James Huffman

[57] ABSTRACT

Disclosed are a circuit and method for providing automatic termination for a small computer systems interface ("SCSI") bus. The circuit resides within a bus controller comprising (1) a control circuit for controlling transmission of data on a bus and for providing an interface between the bus and a computer system for communication of the data therebetween and (2) a first bus port and a second bus port, each of the first and second bus ports permitting a device to be coupled thereto for communication with the control circuit via the bus, the bus controller being at an end of the bus when a single one of the first and second bus ports is coupled to a device and being in a middle of the bus when both the first and second bus ports are coupled to devices. The circuit of the present invention is coupled to the first and second bus ports and is capable of coupling a terminating circuit to the bus as a function of a presence of devices coupled to the first and second bus ports, the bus requiring coupling of the terminating circuit when the bus controller is at the end of the bus.

36 Claims, 3 Drawing Sheets

CIRCUIT FOR PROVIDING AUTOMATIC SCSI BUS TERMINATION

TECHNICAL FIELD OF THE INVENTION

The present invention is directed, in general, to computer buses for transmitting data and, more specifically, to automatic termination of such buses to enhance data transmission quality.

BACKGROUND OF THE INVENTION

Today's standard computer architecture calls for a number of separate components, such as a central processing unit ("CPU"), memory, ports and peripheral devices to be coupled together by electrical buses to provide a pathway for data between the various components. Electrical buses are simply groups of conductors (or lines) designed to operate as a group.

In typical computer architectures, there are address buses, data buses and control buses. Address buses are designed to transmit address data to allow selection of devices and memory locations for data transfer. Data buses carry the substantive data to be transferred. Control buses transmit control signals to allow for synchronization and priority among the various components of the computer, allowing them to work in concert.

Components transmit data over buses by changing voltages on the various lines of the bus. In binary digital computers, each line in a bus is capable of assuming one of two possible states at a given moment. These states are represented by presence or absence of a voltage, or potential difference relative to ground, on each of the lines. In some schemes, the presence of a voltage denotes a change from one state to the other, while the absence of a voltage denotes no change (as in Manchester coding).

During operation, each particular line may change between binary one and binary zero many millions of times a second. It is vital to preserve the integrity and fidelity of the data transmitted over the bus. Therefore, it is vital that transitions between binary one and binary zero be fast and sure. In an ideal world, the bus changes voltages instantaneously and data is transmitted reliably.

Unfortunately, in the real world, buses are real electrical conductors and therefore contain impedance just as do all real conductors. This impedance traps electrical charge within the line, presenting, in a sense, a momentum against which the change must take place. When the line is directed to change from a binary one to a binary zero (meaning a grounding of the line), it resists the change, typically causing a voltage oscillation at the point of transition (termed "ringing"). This ringing may be of sufficient magnitude as to cause components reading data from the bus to misread the oscillation as the presence of a voltage (a binary one) instead of the intended binary zero, thereby corrupting the flow of data.

Therefore, in such conductors, it is standard practice to provide a means by which to dissipate the electrical charge quickly and damp the ringing, so as to restore data transmission fidelity. Damping is achieved through use of a terminating circuit, which can comprise a plurality of resistive elements or active switches.

Some buses require terminating circuits at each end of the bus to provide effective damping. One such bus standard is the small computer systems interface ("SCSI") bus. The SCSI bus is designed to operate in conjunction with microcomputers (also termed personal computers or "PCs") to provide an interface to SCSI standard peripheral devices. SCSI buses require a controller or host card to manage communication of data between the PC and the SCSI devices and between the SCSI devices themselves. In PCs, this controller card is typically placed in a slot within the main chassis of the PC. The controller card contains a control circuit that manages the SCSI bus and at least one SCSI port allowing SCSI devices to couple to the card. SCSI devices are daisy chained together with a common cable. All SCSI devices operate on common signals, and both ends of the cable are terminated with hardware terminating circuits. The terminating circuits, that can be connected to either SCSI devices or to the SCSI cable itself are, as stated above, required to make data transfers on the SCSI bus reliable.

Devices connected to SCSI chains must have the correct number of terminating circuits for proper operation and to prevent damage to the SCSI controller. There can be no more than two terminating circuits in a chain of SCSI devices, one at each end of the physical chain. This means that, if more than two SCSI devices are connected in an SCSI daisy chain, the middle device(s) in the cable must not have terminating circuits coupled to the SCSI bus.

Some controller cards provide two SCSI ports. One port (the "external port") is fitted on a mounting bracket attached to the card, thereby exposing it outside the main chassis when the card is mounted therein. This arrangement allows SCSI devices external to the main chassis to couple to the controller card via the external port. Another port (the "internal port") is mounted to the controller card such that it is exposed in the interior of the main chassis, allowing SCSI devices to be physically mounted within the main chassis and coupled to the internal port.

Since the SCSI bus must be terminated at each end, if both the internal and external ports of the controller card are coupled to SCSI devices, terminating circuits are required at the respective devices. In this case, the controller card is not at the end of the bus and no terminating circuit should be placed on the bus at the controller card. On the other hand, if either one (but not the other) of the external or internal ports is coupled to an SCSI device, then the controller card is at an end of the SCSI bus and a terminating circuit should be placed on the bus at the controller card.

In the past, the user was required to flip configuration switches, install hardware jumpers, or install terminating devices on the controller card to place a terminating circuit on the card when the card was at the end of the bus. If the user then added or subtracted SCSI devices, the configuration switches may have had to be manually changed, depending upon whether the controller card was at the end of the bus or not.

It is undesirable to force a user, who may not be knowledgeable about SCSI buses and their need for termination and who may be uncomfortable with invading the main chassis to flip configuration switches, install jumpers or terminating devices. It is much more preferable to provide a means by which the controller card can automatically determine whether SCSI devices are coupled to its ports and either couple to decouple a terminating circuit to the SCSI bus as a function of the determination.

SUMMARY OF THE INVENTION

It is therefore a primary object of the present invention to provide a circuit that can automatically determine, without any user intervention whatsoever, whether peripheral devices are coupled to one or both of two ports of a controller card to allow the circuit to couple a terminating circuit to the bus when appropriate. The circuit must therefore determine whether the controller card is in the middle or at the end of the bus and to couple or decouple a terminating circuit to or from the bus based on the determination. The terminating circuit substantially eliminates ringing of the bus, thereby improving data transmission quality.

In the attainment of the primary object, the present invention provides a circuit coupled to first and second bus ports of the bus controller card and capable of coupling a terminating circuit to the bus as a function of a presence of devices coupled to the first and second bus ports, the bus requiring coupling of the terminating circuit when the bus controller is at the end of the bus.

The present invention is therefore designed to operate in conjunction with a bus controller card having at least two bus ports. The two bus ports allow the controller card to be in the middle of the bus when devices are coupled to both of the bus ports and to be at the end of the bus when a device is coupled to only one of the two bus ports. The present invention therefore provides the advantage of making bus termination automatic, rather than forcing the user manually to couple the terminating circuit to the bus when required.

The automatic bus termination circuit of the present invention is capable of determining a presence of devices coupled to the first and second bus ports by measuring a voltage of a pin within each of the first and second bus ports. In a preferred embodiment, the pin is one of a number of ground pins. The automatic bus termination circuit impresses a voltage on the pin within each of the first and second bus ports, the voltage removed when a device is coupled thereto. In other words, the device grounds the pin when it is coupled to the port. The automatic bus termination circuit uses the pin within each of the first and second bus ports to determine the presence of a device, the automatic bus termination circuit returning the pin to a normal bus function following operation of the automatic bus termination circuit. This allows the pin to be used subsequently as if the automatic bus termination circuit were not present, since some devices may operate more reliably when the pin is grounded.

Standard SCSI protocol allows for a reset signal to place the devices coupled to the SCSI bus in an initial state. In a preferred embodiment of the present invention, the reset signal also triggers operation of the automatic bus termination circuit. Upon receipt of the reset signal, the automatic bus termination circuit takes control of a chosen one of the ground pins of each bus port, placing a high impedance voltage source on that pin and determining a device to be present on the port if the pin remains grounded. Based on the number of ports coupled to devices, the automatic bus termination circuit either couples or decouples the terminating circuit to or from the bus and returns the chosen pins to their normal grounding function. The terminating circuit functions to reduce undesired voltage transitions (ringing) of signals on the bus.

In a preferred embodiment, the bus is an SCSI bus, that allows devices of various types adhering to a common protocol for data interchange to be coupled thereto. It should be understood that the present invention is not limited to application with SCSI buses, however, and that other buses requiring termination are encompassed hereby.

Finally, a preferred environment for operation of the present invention is a PC, although the present invention is able to operate as effectively with any bus requiring termination.

The foregoing has outlined rather broadly the features and technical advantages of the present invention so that the detailed description of the invention that follows may be better understood. Additional features and advantages of the invention will be described hereinafter which form the subject of the claims of the invention. Those skilled in the art should appreciate that the conception and the specific embodiment disclosed may be readily utilized as a basis for modifying or designing other structures for carrying out the same purposes of the present invention. Those skilled in the art should also realize that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
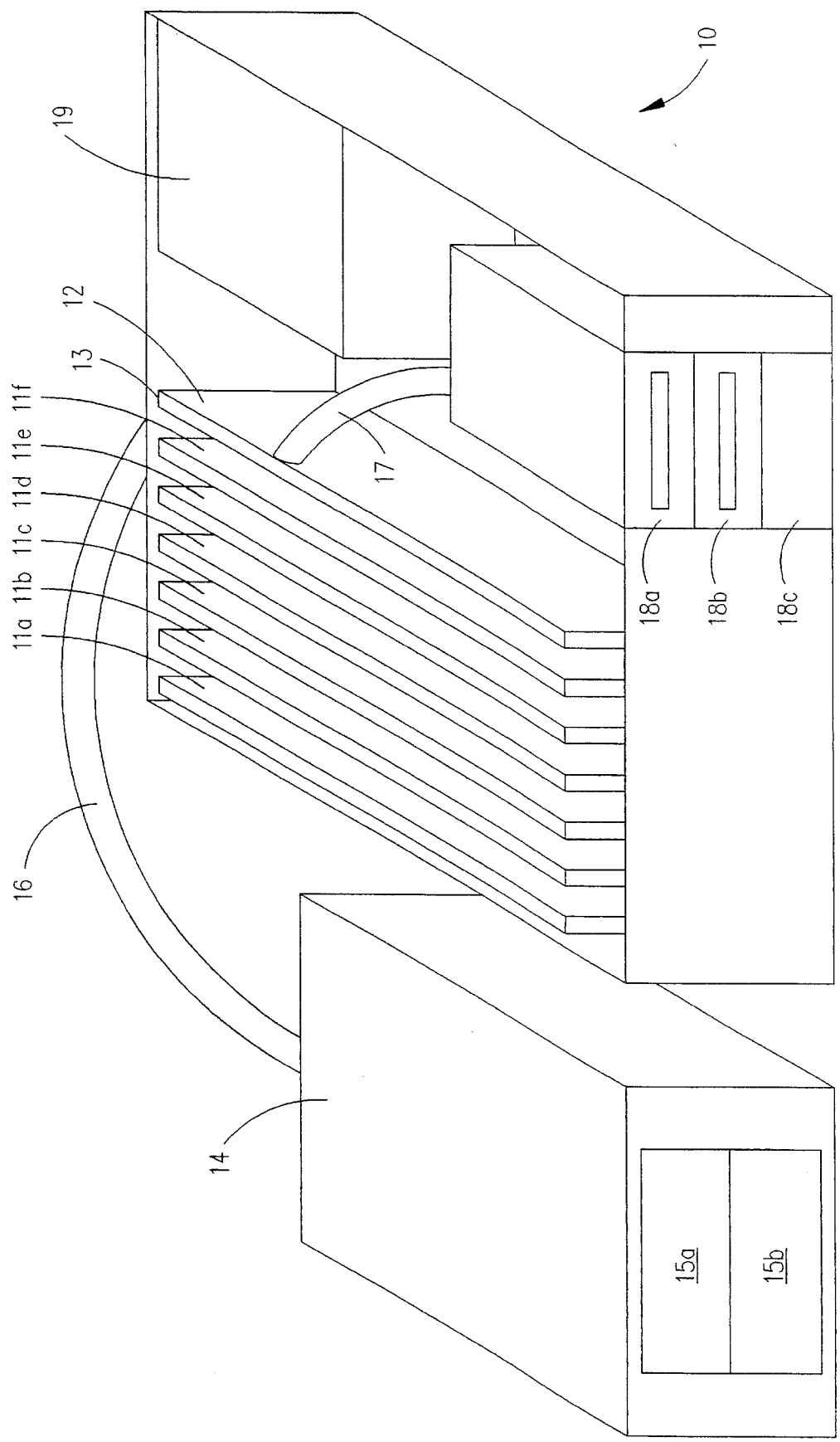
FIG. 1 illustrates an isometric view of a PC main chassis that has been opened to expose components therein and SCSI devices mounted within and without the chassis.

Referring initially to FIG. 1, illustrated is an isometric view of a personal computer ("PC") main chassis 10 that has been opened to expose components therein. The chassis 10 contains a plurality of expansion cards 11a, 11b, 11c, 11d, 11e, 11f that reside in corresponding expansion slots (not shown) that function to couple the cards to address, data and control buses (not shown) within the PC.

Also shown is a small computer systems interface ("SCSI") controller card 12 that includes two SCSI ports. A first, external port (hidden in FIG. 1, but represented in FIG. 2) is mounted on a mounting bracket 13 attached to the controller card 12 and extends externally of the chassis 10 to allow SCSI devices to be coupled thereto. A peripheral chassis 14 is shown as including a pair of devices 15a, 15b that are represented generically as disk storage devices accessible from the front of the peripheral chassis 14. These devices 15a, 15b are connectible to the first, external port by way of an external cable 16.

An internal cable 17 couples internally-mounted SCSI devices 18a, 18b, 18c (again, represented generically as disk storage devices) to a second port on the controller card 12. This coupling allows the internally-mounted devices 18a, 18b, 18c to communicate with the controller card 12. Finally, a power supply 19 supplies power to the cards 11a–11f, 12 and the internally-mounted SCSI devices 18a–18c. It is not typical for the power supply to provide power to externally-mounted devices, such as the devices 15a, 15b.

Figure 2:
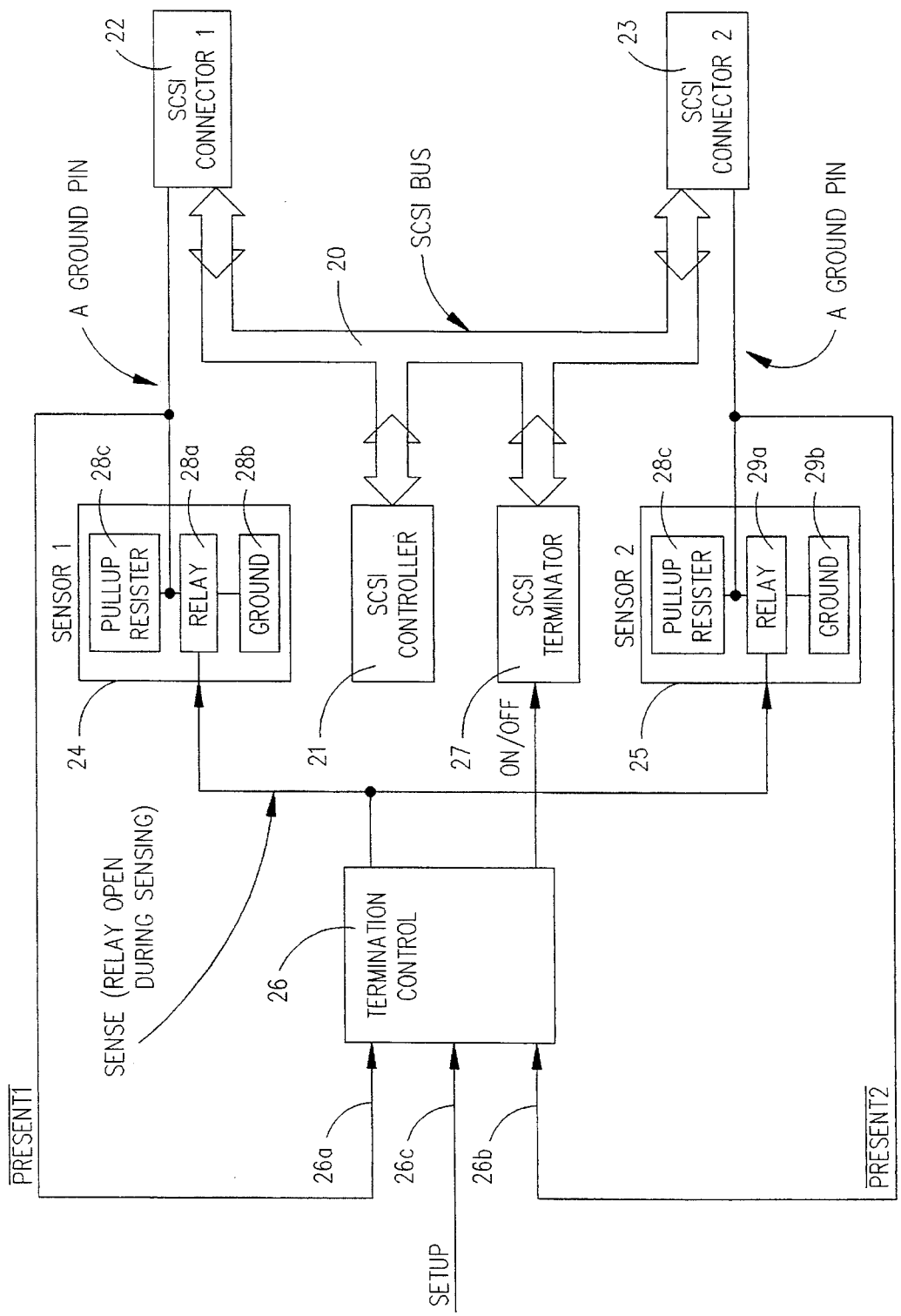
FIG. 2 illustrates a block diagram of the circuit of the present invention.

Turning now to FIG. 2, illustrated is a block diagram of the circuit of the present invention. A SCSI bus 20 couples a SCSI controller 21 to a first SCSI bus connector or port 22 and a second SCSI bus connector or port 23. It does not matter which of the first port 22 or the second port 23 is the external or internal port. The two ports 22, 23 carry the same lines and signals and, apart from physical connector differences, are electrically identical.

The present invention, in a preferred embodiment, involves borrowing a particular ground pin from each of the ports 22, 23 for purposes of determining presence of a SCSI device at each of the ports 22, 23. A first sensor 24, a part of the automatic bus termination circuit, ties to the particular ground pin of the first port 22. A first relay 28a is opened to decouple the ground pin from a ground 28b, allowing a pull-up resistor 28c to impress a voltage on the particular ground pin of the first port 22. A present1* line 26a ("*" denotes active when low) branches from the ground pin to a termination control 26, another part of the automatic bus termination circuit. If a device is coupled to the first port 22, the device grounds the particular ground pin by coupling it to other ground pins in the first port 22. Thus, the ground pin is high if no device is present and low if at least one device is present.

Likewise, a second sensor 25, yet another part of the automatic bus termination circuit, ties to the particular ground pin of the second port 23. A second relay 29a is opened to decouple the ground pin from a ground 29b, allowing a pull-up resistor 29c to impress a voltage on the particular ground pin of the second port 23. A present2* line 26b branches from the ground pin to the termination control 26. If a device is coupled to the second port 23, the device grounds the particular ground pin by coupling it to other ground pins in the second port 23. Thus, as with the first port 22, the ground pin is high if no device is present and low if at least one device is present.

The termination control 26 receives the present1* and present2* lines 26a, 26b and couples or decouples an SCSI terminator (or terminating circuit) 27 to or from the SCSI bus 20 as a function of the status or voltage level of the present1* and present2* lines 26a, 26b. If both the present1* and present2* lines 26a, 26b are low, the SCSI terminating circuit 27 is decoupled from the SCSI bus 20, because the card is located in a middle of the bus 20, and termination should occur in the devices. If either one of the present1* or present2* lines 26a, 26b is high, the SCSI terminating circuit 27 is coupled to the SCSI bus 20 because the card is located at an end of the bus 20.

A setup line 26c carries a setup signal into the termination control 26, allowing a setup signal, occasionally issued as standard SCSI protocol, to signal the termination circuit 26 to sense the status of the present1* and present2* lines 26a, 26b and automatically configure the terminating circuit 27 in response thereto.

After the termination control 26 has sensed and configured to terminate the SCSI bus 20 properly, the first and second relays 28a, 29a close to couple the borrowed ground pins to ground 28b, 29b, returning the pins to their normal bus function, namely, to function as ground pins.

In a preferred embodiment of the invention, the terminating circuit 27 is, for example, a UC80989DWP, manufactured by the Unitrode Corporation. The UC80989DWP provides a DISABLE input that, when brought low by the termination control 26, decouples the UC80989DWP from the SCSI bus 20. Terminating circuits by other manufacturers are provided with similar inputs allowing them to be selectively coupled and decoupled.

There are many ground pins available on the standard SCSI connector that can be borrowed for the present invention. However, to minimize the chance that a device requires that the pin always be grounded, the present invention preferably makes use of ground pins that are paired with adjacent ground pins on the connector. These pin pairs are currently 1–26, 16–41 and 25–50 for a differential port and 11–36 and 17–42 for a single-ended port. Only one of these pins is required for the present invention's use.

Finally, the present invention can be disabled to manually couple or decouple the terminating circuit 27 from the SCSI bus 20 by providing a jumper that forces the termination control 26 to either enable or disable the terminating circuit 27 regardless of the state of the present1* or present2* lines. There are many conventional ways to implement this feature.

Figure 3:
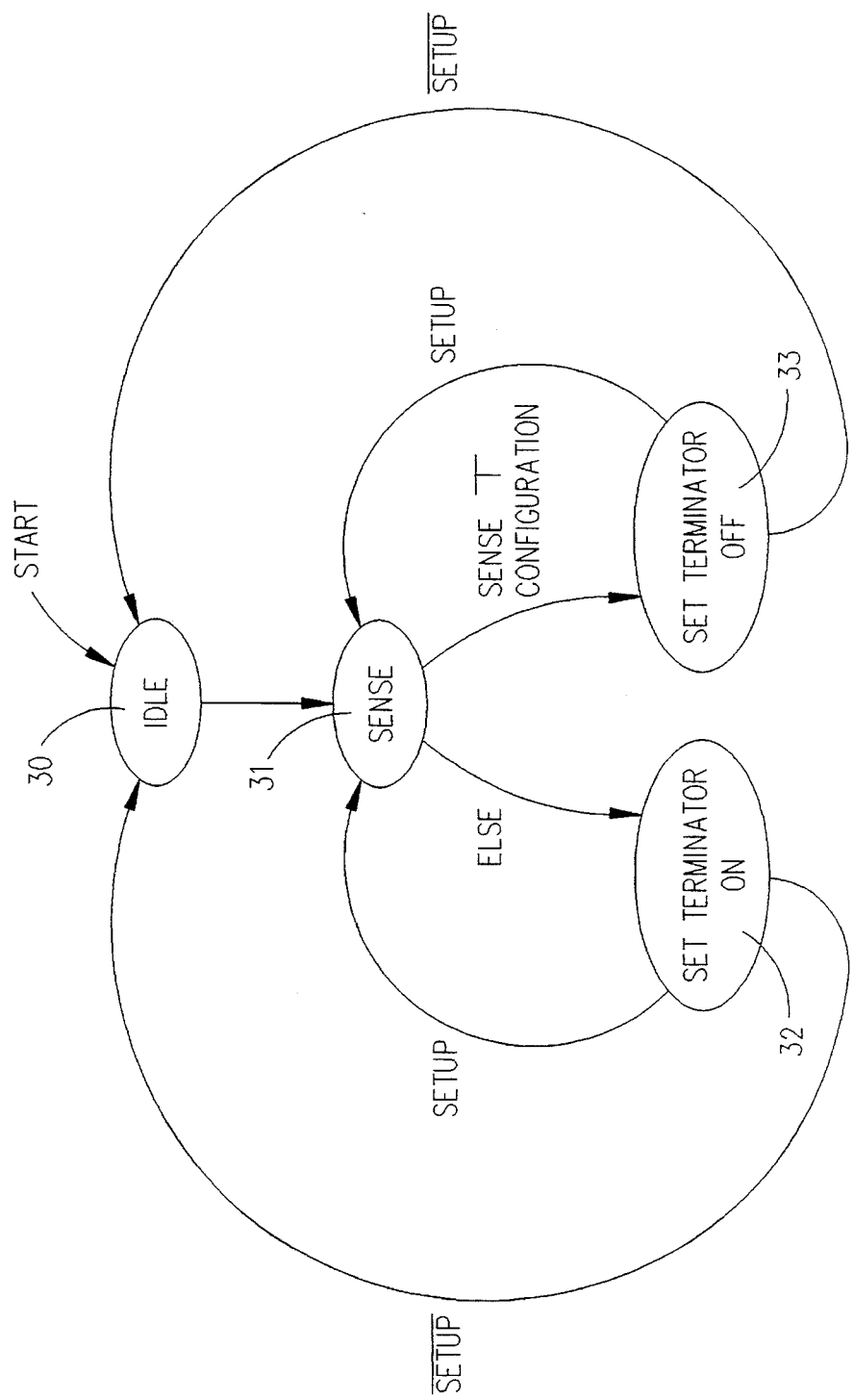
FIG. 3 illustrates a state diagram of the circuit and method of the present invention.

Turning now to FIG. 3, illustrated is a state diagram of the circuit and method of the present invention. The automatic bus termination circuit is normally idle (state 30). When the setup signal is issued, the automatic bus termination circuit enters a sense state 31. Depending upon the status of the present1* and present2* lines 26a, 26b of FIG. 2, the circuit either enters a state 32 wherein the terminating circuit 27 is coupled to the bus 20 or a state 33 wherein the terminating circuit 27 is decoupled from the bus 20. Following state 32 or 33, the automatic bus termination circuit loops back to the sense state until the setup signal is negated and then the circuit returns to idle.

Although the present invention and its advantages have been described in detail in the foregoing detailed description, those skilled in the art should understand that the detailed description is given by way of illustration only and that various changes, substitutions and alterations can be made herein without departing from the spirit and scope of the invention as defined and limited solely by the appended claims.

What is claimed is:

1. A bus controller, comprising:

a control circuit for controlling transmission of data on a bus and for providing an interface between said bus and a computer system for communication of said data therebetween;

a first bus port and a second bus port, each of said first and second bus ports permitting a device to be coupled thereto for communication with said control circuit via said bus, said bus controller being at an end of said bus when a single one of said first and second bus ports is coupled to a device and being in a middle of said bus when both said first and second bus ports are coupled to devices; and an automatic bus termination circuit coupled to said first and second bus ports and capable of coupling a terminating circuit to said bus as a function of a presence of devices coupled to said first and second bus ports, said bus requiring coupling of said terminating circuit when said bus controller is at said end of said bus.

2. The controller as recited in claim 1 wherein said bus is a small computer systems interface (SCSI) bus.

3. The controller as recited in claim 1 wherein said automatic bus termination circuit is capable of determining a presence of devices coupled to said first and second bus ports by measuring a voltage of a pin within each of said first and second bus ports.

4. The controller as recited in claim 1 wherein said automatic bus termination circuit impresses a voltage on a pin within each of said first and second bus ports, said voltage removed when a device is coupled thereto.

5. The controller as recited in claim 1 wherein said automatic bus termination circuit uses a pin within each of said first and second bus ports to determine said presence, said automatic bus termination circuit returning said pin to a normal bus function following operation of said automatic bus termination circuit.

6. The controller as recited in claim 1 wherein a bus setup signal triggers operation of said automatic bus termination circuit.

7. The controller as recited in claim 1 wherein said terminating circuit reduces ringing of signals on said bus.

8. The controller as recited in claim 1 wherein said computer system is a personal computer.

9. A method of automatically terminating a bus at a bus controller, comprising the steps of:

controlling transmission of data on a bus with a control circuit, said control circuit providing an interface between said bus and a computer system for communication of said data therebetween;

allowing devices to be coupled to a first bus port and a second bus port, each of said first and second bus ports permitting devices coupled thereto to communicate with said control circuit via said bus, said bus controller being at an end of said bus when a single one of said first and second bus ports is coupled to a device and being in a middle of said bus when both said first and second bus ports are coupled to devices; and coupling a terminating circuit to said bus as a function of a presence of devices coupled to said first and second bus ports with an automatic bus termination circuit coupled to said first and second bus ports, said bus requiring coupling of said terminating circuit when said bus controller is at said end of said bus.

10. The method as recited in claim 9 wherein said bus is a small computer systems interface (SCSI) bus.

11. The method as recited in claim 9 further comprising the step of determining, with said automatic bus termination circuit, a presence of devices coupled to said first and second bus ports by measuring a voltage of a pin within each of said first and second bus ports.

12. The method as recited in claim 9 further comprising the step of impressing, with said automatic bus termination circuit, a voltage on a pin within each of said first and second bus ports, said voltage being removed when a device is coupled thereto.

13. The method as recited in claim 9 further comprising the step of using, with said automatic bus termination circuit, a pin within each of said first and second bus ports to determine said presence, said automatic bus termination circuit returning said pin to a normal bus function following operation of said automatic bus termination circuit.

14. The method as recited in claim 9 further comprising the step of triggering operation of said automatic bus termination circuit with a bus setup signal.

15. The method as recited in claim 9 wherein said terminating circuit reduces ringing of signals on said bus.

16. The method as recited in claim 9 wherein said computer system is a personal computer.

17. A controller for a small computer systems interface (SCSI) bus, comprising:

an SCSI control circuit for controlling transmission of data on said SCSI bus and for providing an interface between said SCSI bus and a personal computer for communication of said data therebetween;

a first SCSI port and a second SCSI port, each of said first and second SCSI ports permitting an SCSI device to be coupled thereto for communication with said SCSI control circuit via said SCSI bus, said controller being at an end of said SCSI bus when a single one of said first and second SCSI ports is coupled to an SCSI device and being in a middle of said SCSI bus when both said first and second SCSI ports are coupled to SCSI devices; and an automatic bus termination circuit coupled to said first and second SCSI ports and capable of coupling an SCSI bus terminator to said bus as a function of a presence of SCSI devices coupled to said first and second SCSI ports.

18. The controller as recited in claim 17 wherein said automatic bus termination circuit is capable of determining a presence of SCSI devices coupled to said first and second SCSI ports by measuring a voltage of a pin within each of said first and second SCSI ports.

19. The controller as recited in claim 17 wherein said automatic bus termination circuit impresses a voltage on a pin within each of said first and second SCSI ports, said voltage removed when an SCSI device is coupled thereto.

20. The controller as recited in claim 17 wherein said automatic bus termination circuit uses a pin within each of said first and second SCSI ports to determine said presence, said automatic bus termination circuit returning said pin to a normal SCSI bus function following operation of said automatic bus termination circuit.

21. The controller as recited in claim 17 wherein an SCSI bus setup signal triggers operation of said automatic bus termination circuit.

22. The controller as recited in claim 17 wherein said SCSI terminator reduces ringing of signals on said SCSI bus.

23. A method of terminating a small computer systems interface (SCSI) bus at an SCSI controller, comprising the steps of:

controlling transmission of data on an SCSI bus with an SCSI control circuit, said SCSI control circuit providing an interface between said bus and a personal computer for communication of said data therebetween;

allowing SCSI devices to be coupled to a first SCSI port and a second SCSI port, each of said first and second SCSI ports permitting devices coupled thereto to communicate with said SCSI control circuit via said SCSI bus, said SCSI controller being at an end of said SCSI bus when a single one of said first and second SCSI ports is coupled to a SCSI device and being in a middle of said SCSI bus when both said first and second SCSI ports are coupled to SCSI devices; and coupling an SCSI terminator to said SCSI bus as a function of a presence of SCSI devices coupled to said first and second SCSI ports with an automatic bus termination circuit coupled to said first and second SCSI ports.

24. The method as recited in claim 23 further comprising the step of determining, with said automatic bus termination circuit, a presence of SCSI devices coupled to said first and second SCSI ports by measuring a voltage of a pin within each of said first and second SCSI ports.

25. The method as recited in claim 23 further comprising the step of impressing, with said automatic bus termination circuit, a voltage on a pin within each of said first and second SCSI ports, said voltage being removed when an SCSI device is coupled thereto.

26. The method as recited in claim 23 further comprising the step of using, with said automatic bus termination circuit, a pin within each of said first and second SCSI ports to determine said presence, said automatic bus termination circuit returning said pin to a normal SCSI bus function following operation of said automatic bus termination circuit.

27. The method as recited in claim 23 further comprising the step of triggering operation of said automatic bus termination circuit with an SCSI bus setup signal.

28. The method as recited in claim 23 wherein said SCSI terminator reduces ringing of signals on said SCSI bus.

29. A circuit for providing automatic small computer systems interface (SCSI) bus termination, comprising:

a first circuit for placing a first selected pin in a first SCSI bus port at a first selected voltage, said first selected voltage being changed when a first SCSI device is coupled to said first SCSI bus port;

a second circuit for placing a second selected pin in a second SCSI bus port at a second selected voltage, said second selected voltage being changed when a second SCSI device is coupled to said second SCSI bus port, an SCSI bus coupled between said first and second SCSI bus ports for communication of data therebetween; and a termination control circuit capable of determining whether said first and second selected voltages are changed and for coupling an SCSI terminator to said SCSI bus when only one of said first and second voltages is changed, said coupling signifying that said SCSI terminator is at an end of said SCSI bus.

30. The circuit as recited in claim 29 wherein said termination control circuit returns said first and second selected pins to a normal SCSI bus function following operation of said automatic bus termination circuit.

31. The circuit as recited in claim 29 wherein an SCSI bus setup signal triggers operation of said termination control circuit.

32. The circuit as recited in claim 29 wherein said SCSI terminator reduces ringing of signals on said SCSI bus.

33. A method of providing automatic SCSI bus termination, comprising:

placing a first selected pin in a first SCSI bus port at a first selected voltage with a first circuit, said first selected voltage being changed when a first SCSI device is coupled to said first SCSI bus port;

placing a second selected pin in a second SCSI bus port at a second selected voltage with a second circuit, said second selected voltage being changed when a second SCSI device is coupled to said second SCSI bus port, an SCSI bus coupled between said first and second SCSI bus ports for communication of data therebetween; and determining, with a termination control circuit, whether said first and second selected voltages are changed; and coupling an SCSI terminator to said SCSI bus when only one of said first and second voltages is changed, said coupling signifying that said SCSI terminator is at an end of said SCSI bus.

34. The method as recited in claim 33 further comprising the step of returning, with said termination control circuit, said first and second selected pins to a normal SCSI bus function following operation of said automatic bus termination method.

35. The method as recited in claim 33 further comprising the step of triggering, with an SCSI bus setup signal, operation of said termination control circuit.

36. The method as recited in claim 33 wherein said SCSI terminator reduces ringing of signals on said SCSI bus.

* * * * *